(12) United States Patent
Yokotani

(10) Patent No.: US 11,543,726 B2
(45) Date of Patent: Jan. 3, 2023

(54) DISPLAY DEVICE

(71) Applicant: Japan Display Inc., Minato-ku (JP)

(72) Inventor: Yuki Yokotani, Tokyo (JP)

(73) Assignee: Japan Display Inc., Tokyo (JP)

( * ) Notice: Subject to any disclaimer, the term of this patent is extended or adjusted under 35 U.S.C. 154(b) by 253 days.

(21) Appl. No.: 16/944,238

(22) Filed: Jul. 31, 2020

(65) Prior Publication Data

US 2021/0033941 A1 Feb. 4, 2021

(30) Foreign Application Priority Data

Jul. 31, 2019 (JP) .............................. JP2019-141505

(51) Int. Cl.
*G02F 1/167* (2019.01)
*G02F 1/1333* (2006.01)

(52) U.S. Cl.
CPC ........ *G02F 1/167* (2013.01); *G02F 1/133305* (2013.01); *G02F 1/133385* (2013.01)

(58) Field of Classification Search
None
See application file for complete search history.

(56) References Cited

U.S. PATENT DOCUMENTS

| 2007/0085071 A1* | 4/2007 | Kim ...................... H01L 51/052 |
| | | 257/40 |
| 2008/0012017 A1* | 1/2008 | Jung ................. G02F 1/136286 |
| | | 438/30 |
| 2009/0045408 A1 | 2/2009 | Sakai et al. |

FOREIGN PATENT DOCUMENTS

| JP | 2006-349903 A | 12/2006 | |
| JP | 2009-49080 A | 3/2009 | |
| JP | 2010-217916 A | 9/2010 | |
| WO | WO 00/03291 A1 | 1/2000 | |
| WO | WO-2008059633 A1 * | 5/2008 | ....... G02F 1/136227 |

* cited by examiner

*Primary Examiner* — Phu Vu
(74) *Attorney, Agent, or Firm* — Maier & Maier, PLLC

(57) ABSTRACT

According to one embodiment, a display device including an insulating substrate, an organic film on the insulating substrate, and a switching element located between the insulating substrate and the organic film and including a semiconductor layer, a source electrode, and a drain electrode, the organic film including a first removed portion at a position overlapping the semiconductor layer between the source electrode and the drain electrode of the switching element.

10 Claims, 14 Drawing Sheets

| Materials | Densities | Specific heat | Thermal conductivities | | CTE |
|---|---|---|---|---|---|
| | kg/um3 | uJ/Kg·K | mW/um·K | W/m·K | 10-6/K |
| Glass | 2.51E-15 | 8.37E+08 | 0.0013 | 1.3 | 3.48 |
| Al | 2.70E-15 | 9.04E+08 | 0.237 | 237 | 24 |
| ITO | 7.14E-15 | 2.33E+08 | 0.005 | 5 | 7.2 |
| Ti | 4.51E-15 | 5.20E+08 | 0.017 | 17 | 8.4 |
| Mo | 1.03E-14 | 2.75E+08 | 0.135 | 135 | 4.8 |
| SiN | 3.20E-15 | 6.80E+08 | 0.0012 | 1.2 | 1 |
| SiO | 2.20E-15 | 7.60E+08 | 0.0012 | 1.2 | 0.6 |
| Acrylic resin | 1.18E-15 | 1.47E+09 | 0.00025 | 0.25 | 40 |

F I G. 4

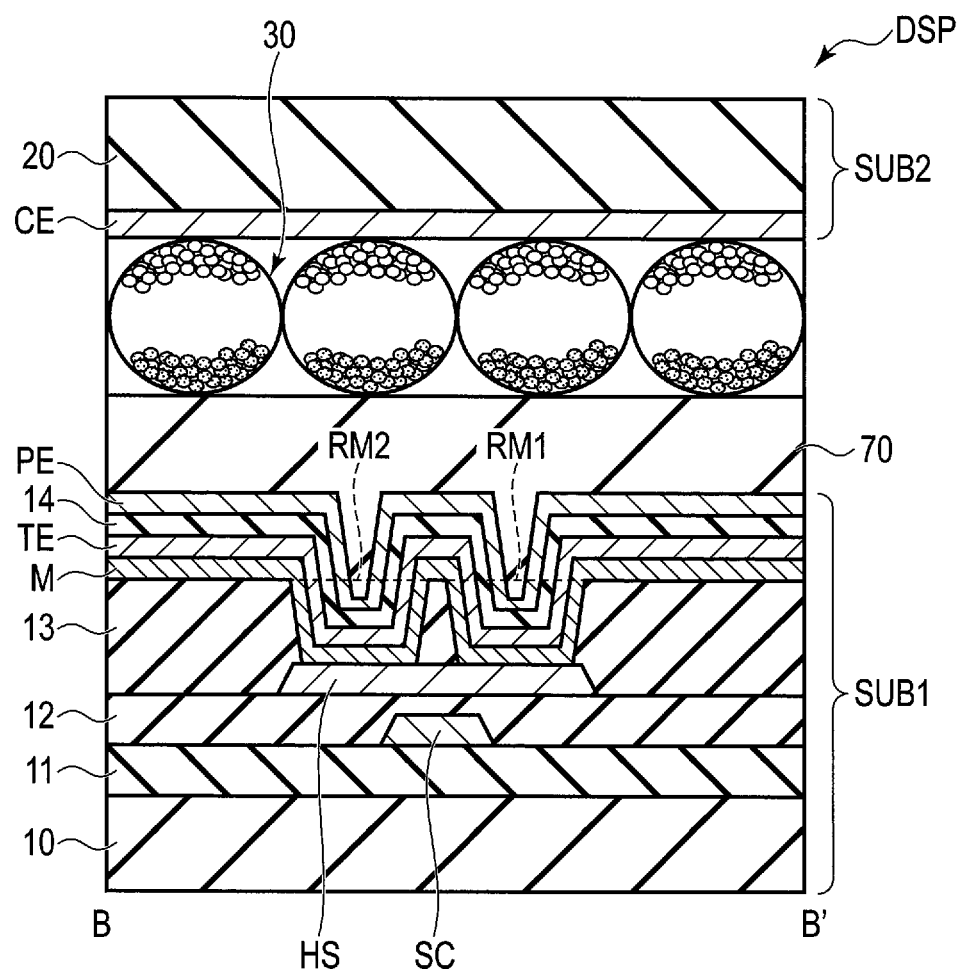
F I G. 7

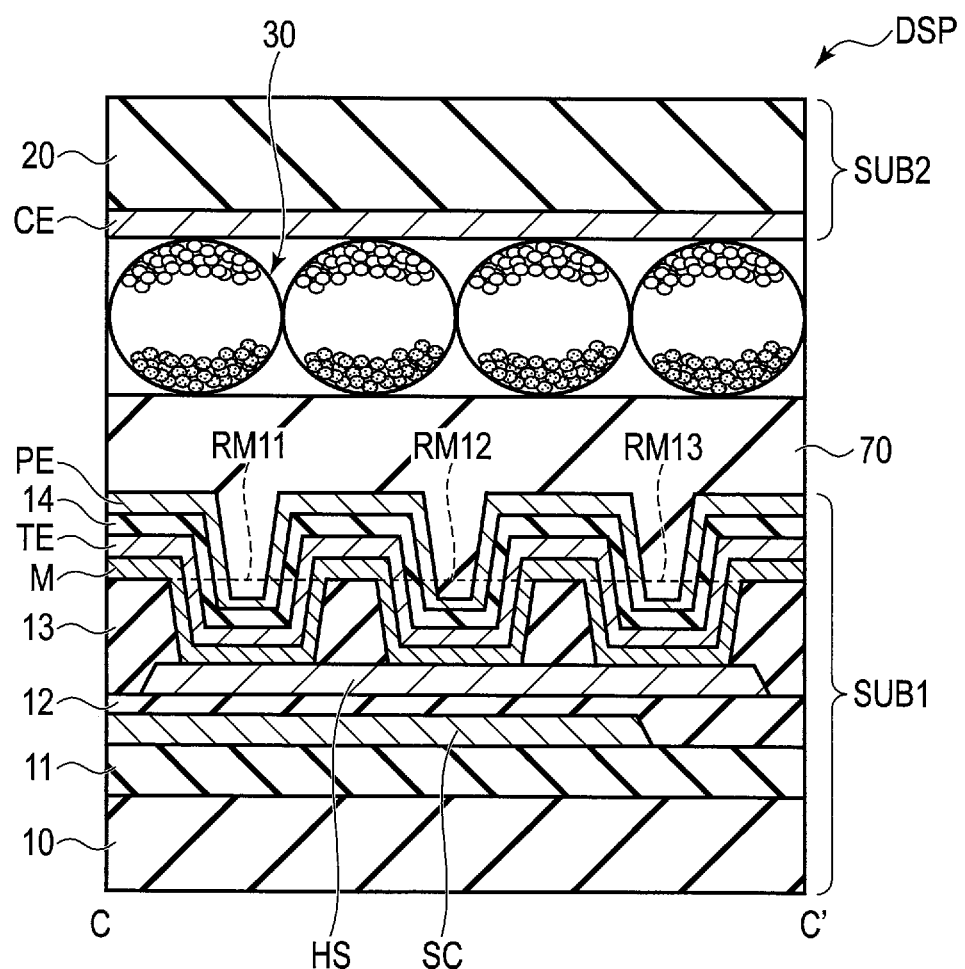
F I G. 9

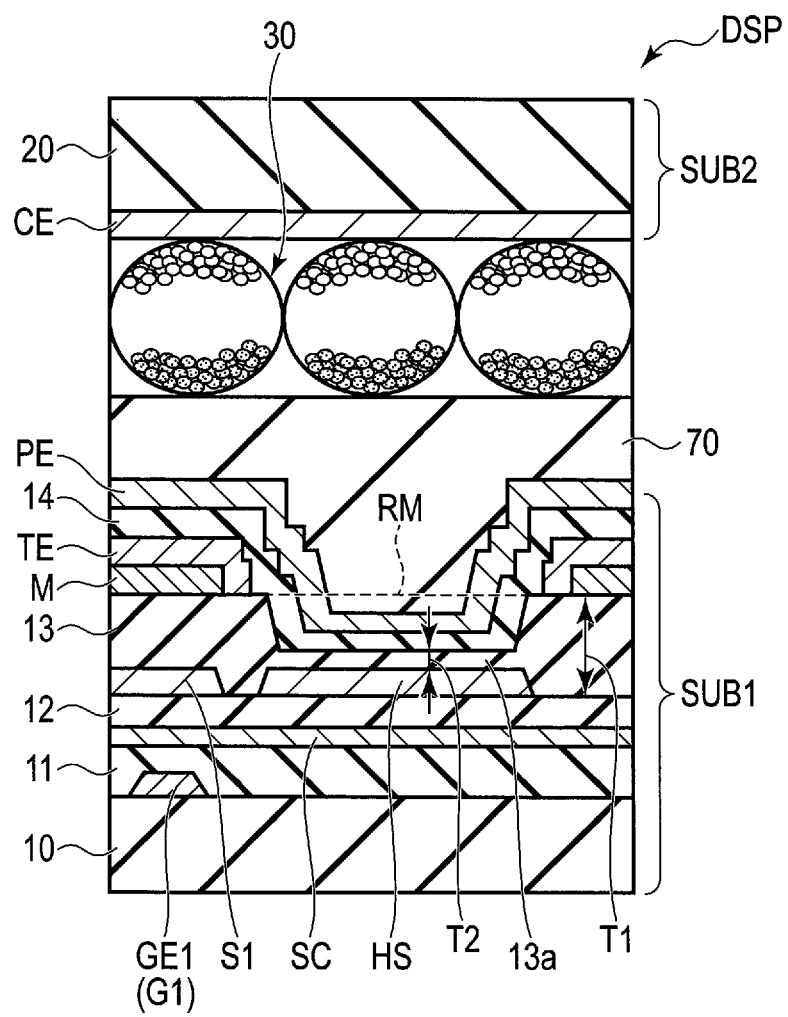
F I G. 11

DISPLAY DEVICE

CROSS-REFERENCE TO RELATED APPLICATIONS

This application is based upon and claims the benefit of priority from Japanese Patent Application No. 2019-141505, filed Jul. 31, 2019, the entire contents of which are incorporated herein by reference.

FIELD

Embodiments described herein relate generally to a display device.

BACKGROUND

In general, an electrophoretic display (EPD), which holds an electrophoretic element between an element substrate and a counter-substrate, is well known. According to the electrophoretic display, a pixel transistor included in each of pixels arrayed in the electrophoretic display is driven such that, for example, a white or black color can be displayed on each of the pixels. Incidentally, a drive voltage is high in the electrophoretic display, and a high voltage is also applied to the pixel transistor. For this reason, in the electrophoretic display, an abnormal characteristic or abnormal operation may occur due to the heat resulting from the high voltage applied to the pixel transistor.

BRIEF DESCRIPTION OF THE DRAWINGS

FIG. 4 is a table showing thermal conductivities of materials used in each layer of the display device.

FIG. 7 is a cross-sectional view showing a switching element shown in FIG. 6 seen along line B-B'.

FIG. 9 is a cross-sectional view showing a switching element shown in FIG. 8 seen along line C-C'.

FIG. 11 is a cross-sectional view showing a fifth modified example of the embodiment.

DETAILED DESCRIPTION

Figure 1:
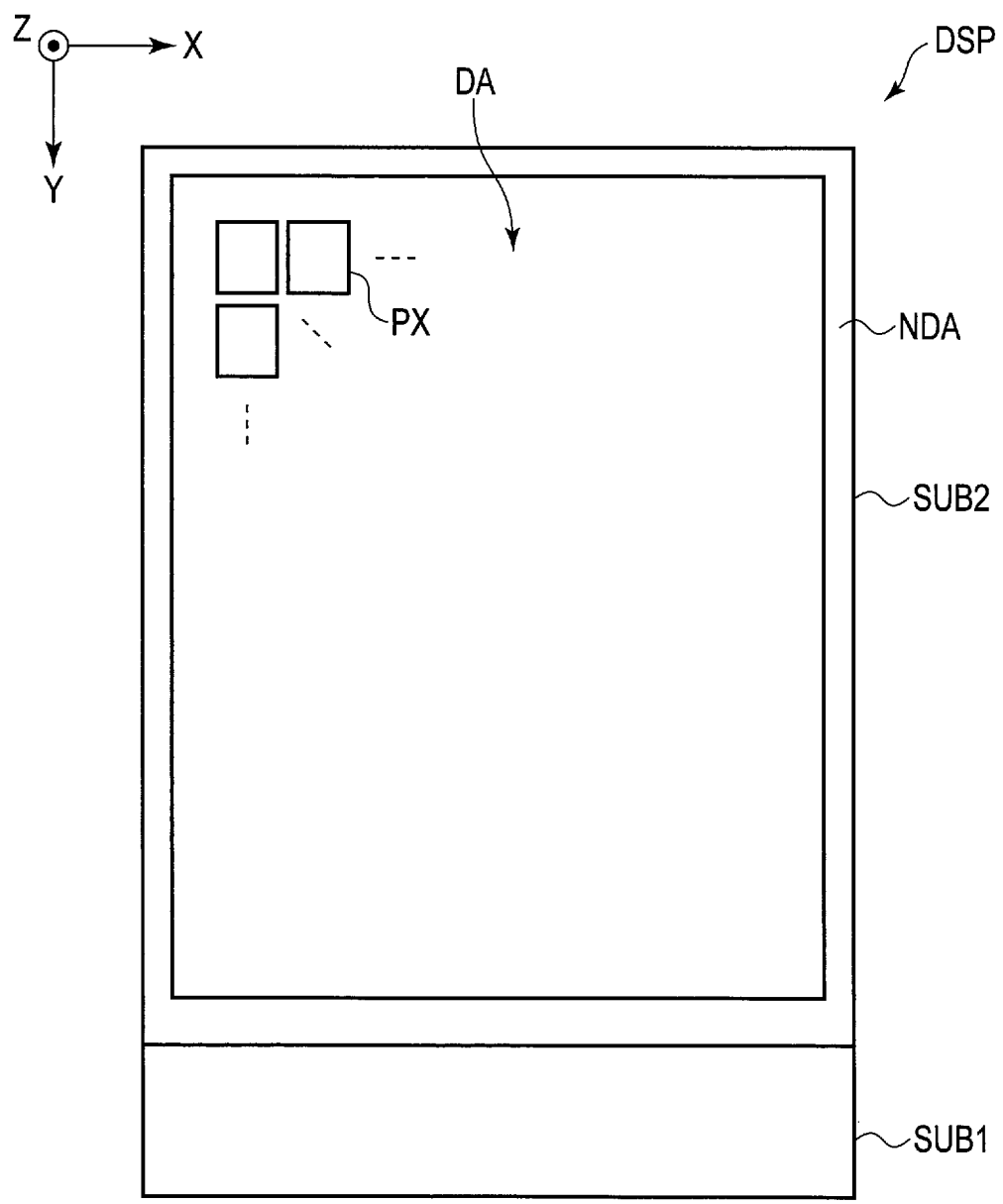
FIG. 1 is a plan view showing a configuration example of a display device of the embodiment.

In general, according to one embodiment, there is provided a display device comprising an insulating substrate, an organic film on the insulating substrate, and a switching element located between the insulating substrate and the organic film, and comprising a semiconductor layer, a source electrode, and a drain electrode. The organic film includes a first removed portion at a position overlapping the semiconductor layer between the source electrode and the drain electrode of the switching element.

One of embodiments will be described hereinafter with reference to accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP of the embodiment.

In the figure, a first direction X and a second direction Y are directions intersecting each other, and a third direction Z is a direction intersecting the first direction X and the second direction Y. For example, the first direction X, the second direction Y, and the third direction Z are orthogonal to each other but may intersect at an angle other than 90 degrees. In the present specification, a direction toward a pointing end of an arrow indicating the third direction Z is referred to as upward (or merely above), and a direction toward the opposite side from the pointing end of the arrow is referred to as downward (or merely below). In addition, an observation position at which the display device DSP is observed is assumed to be located on the tip side of the arrow indicating the third direction Z, and viewing from the observation position toward the X-Y plane defined by the first direction X and the second direction Y is called a planar view.

The display device DSP comprises a first substrate SUB1 and a second substrate SUB2. The display device DSP comprises a display portion DA in which an image is displayed, and a non-display portion NDA around the display portion DA. The display portion DA is located in a region where the first substrate SUB1 and the second substrate SUB2 overlap each other in planar view. The display portion DA comprises pixels PX arrayed in a matrix. The non-display portion NDA is formed in a frame shape.

Figure 2:
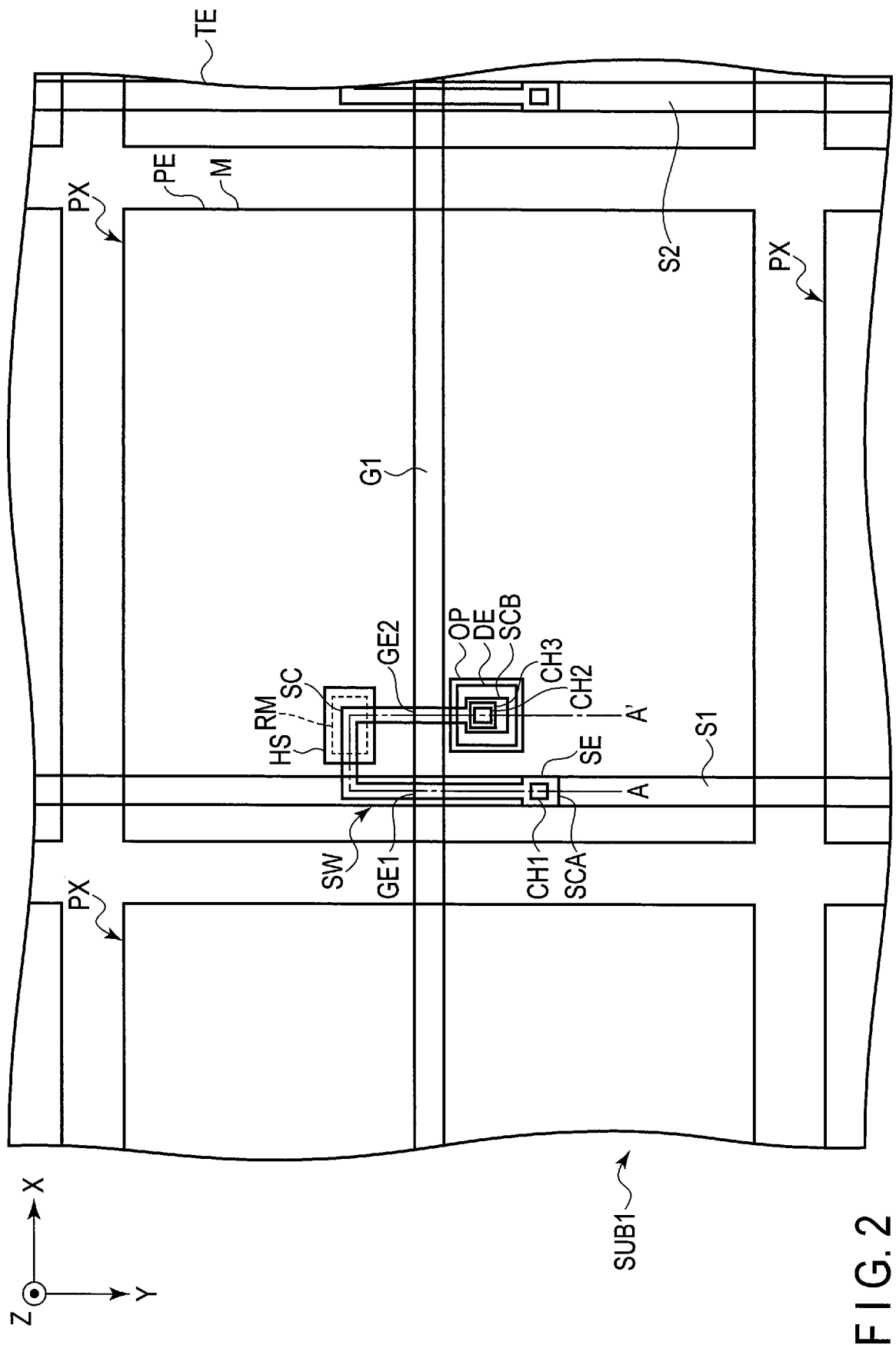
FIG. 2 is a plan view showing a pixel of the display device shown in FIG. 1.

FIG. 2 is a plan view showing the pixel PX of the display device DSP shown in FIG. 1.

Only main elements of the first substrate SUB1 shown in FIG. 1, of the pixel PX, are illustrated. The pixel PX comprises a switching element SW, a reflective film M, a pixel electrode PE, a transparent conductive coating TE, and a heat dissipating plate HS. In addition, the heat dissipating plate HS may be simply restated as a first metal layer HS and the reflective film M may be simply restated as a second metal layer M.

In the following descriptions, the pixel PX is defined as a region where the pixel electrode PE is formed.

The switching element SW comprises gate electrodes GE1 and GE2, a semiconductor layer SC, a source electrode SE, and a drain electrode DE. The illustrated switching element SW has a double-gate structure but may have a single-gate structure. In addition, the switching element SW may have a top-gate structure in which the gate electrodes GE1 and GE2 are arranged above the semiconductor layer SC or a bottom-gate structure in which the gate electrodes GE1 and GE2 are arranged below the semiconductor layer SC.

The semiconductor layer SC is electrically connected to a source line S1 through a contact hole CH1 at an end part SCA of the semiconductor layer SC and is electrically connected to the drain electrode DE through a contact hole CH2 at the other end part SCB of the semiconductor layer SC. The semiconductor layer SC intersects a gate line G1 between the end part SCA and the other end part SCB.

The gate electrodes GE1 and GE2 correspond to regions overlapping the semiconductor layer SC of the gate line G1. In the example illustrated, the gate line G1 extends along the first direction X and crosses a central part of the pixel PX. The source electrode SE includes a region which is in contact with the semiconductor layer SC, of the source line S1. In the example illustrated, the source line S1 extends along the second direction Y and is located on a left end part of the pixel PX. The drain electrode DE is formed in an insular shape and is arranged between the source lines S1 and S2.

The reflective film M overlaps the pixel electrode PE, the transparent conductive coating TE, the switching element SW, the gate line G1, and the source line S1, in the pixel PX. The reflective film M is formed in an insular shape, in each pixel PX. In addition, the reflective film M formed in an insular shape may be smaller than the pixel electrode PE so as to be accommodated in the inside rather than the outside of the pixel electrode PE.

The transparent conductive coating TE overlaps the pixels PX arranged in the first direction X and the second direction Y, and also overlaps both the gate line G1 and the source line S1. The transparent conductive coating TE is formed over the substantially entire region of the display portion DA shown in FIG. 1. The transparent conductive coating TE is supplied with, for example, a common potential in the non-display portion NDA. The transparent conductive coating TE and the reflective film M have an opening OP at a position which overlaps the drain electrode DE in each pixel PX. The opening OP communicates with the switching element SW.

In addition, the transparent conductive coating TE may be formed in an insular shape, similarly to the reflective film M. The transparent conductive coating TE formed in an insular shape may be smaller than the pixel electrode PE so as to be accommodated in the inside rather than the outside of the pixel electrode PE. In this case, the reflective film M thus formed in an insular shape and the transparent conductive coating TE formed in an insular shape are connected to reflective films and transparent conductive coatings of the other pixels by metal lines (not shown).

In the embodiment, the transparent conductive coating TE is assumed to be formed over the substantially entire region of the display portion DA.

The pixel electrode PE overlaps the transparent conductive coating TE, the reflective film M, the switching element SW, the gate line G1, and the source line S1, in the pixel PX. The pixel electrode PE is electrically connected to the drain electrode DE through a contact hole CH3 and the opening OP. In the example illustrated, the pixel electrode PE and the reflective film M have substantially the same area and substantially the same shape, but the area of the pixel electrode PE and the area of the reflective film M may be different from each other as described above.

A part where the pixel electrode PE and the transparent conductive coating TE overlap corresponds to a pixel capacitor of each pixel PX, in planar view. In the example illustrated, since the transparent conductive coating TE is formed over the substantially entire area of the pixel PX, the substantially whole area of the region (pixel PX) where the pixel electrode PE is formed overlaps the transparent conductive coating TE to form the pixel capacitor.

The heat dissipating plate HS is arranged at a position which overlaps the semiconductor layer SC. In addition, the heat dissipating plate HS overlaps the reflective film M, the pixel electrode PE, and the transparent conductive coating TE. The heat dissipating plate HS is located on the opposite side to the drain electrode DE with respect to the gate line G1. In addition, the heat dissipating plate HS is located on the same side as the drain electrode DE with respect to the source line S1. The heat dissipating plate HS is formed in a rectangular shape in which the width in the first direction X is larger than the width in the second direction Y in planar view. As described with reference to FIG. 3, the first substrate SUB1 comprises an organic film 13 which covers the switching element SW. The organic film 13 includes a removed portion RM at a position which overlaps the heat dissipating plate HS. As shown in the figure, for example, the removed portion RM is formed in a rectangular shape in which the width in the first direction X is larger than the width in the second direction Y in planar view. Each of the width in the first direction X and the width in the second direction Y of the removed portion RM is in range from 1 to 10 μm.

Figure 3:
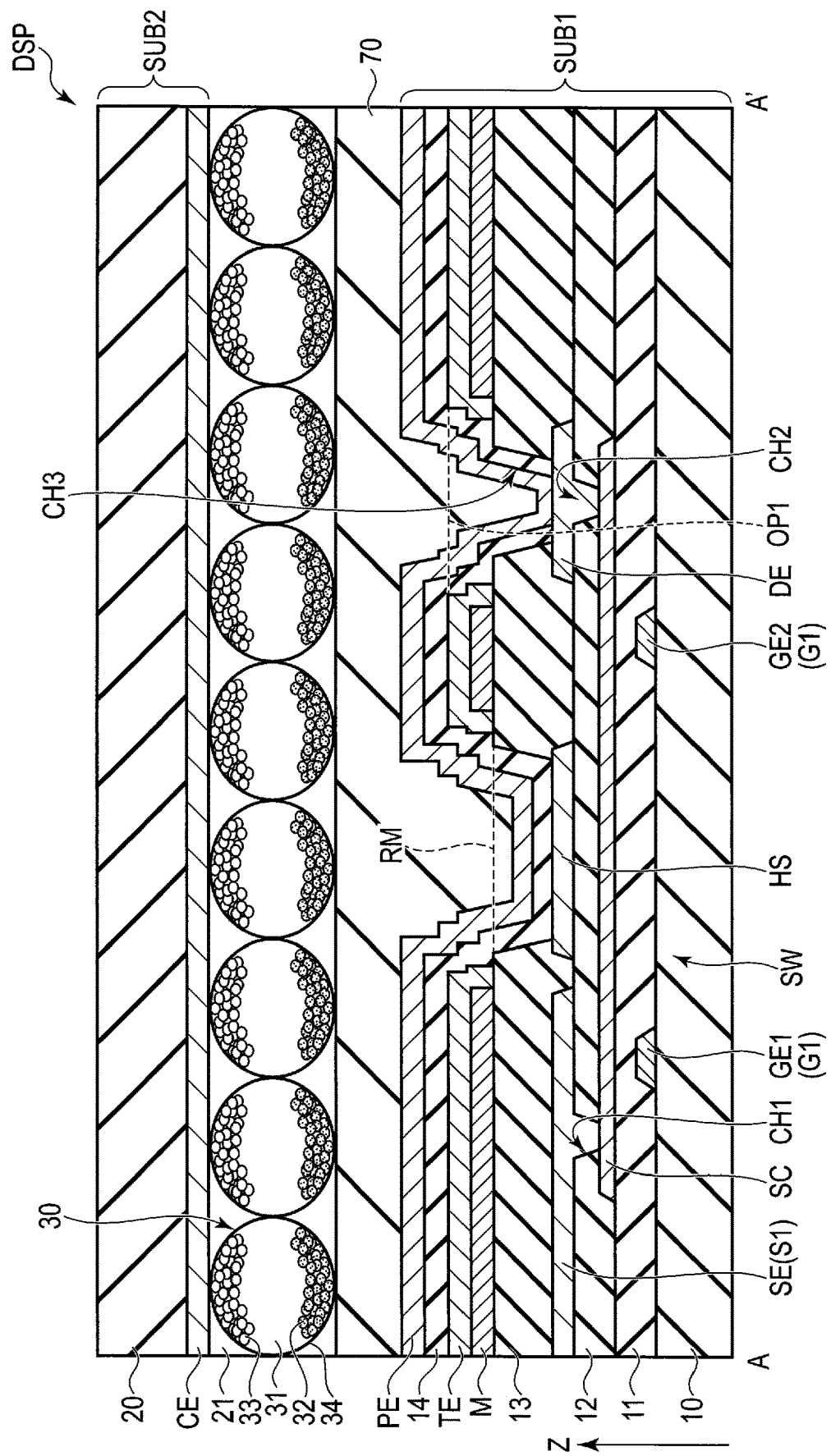
FIG. 3 is a cross-sectional view showing the pixel shown in FIG. 2 seen along line A-A'.

FIG. 3 is a cross-sectional view showing the pixel PX shown in FIG. 2 seen along line A-A'. In addition, FIG. 4 is a table showing thermal conductivities of materials used in each layer of the display device DSP.

The first substrate SUB1 and the second substrate SUB2 are bonded together by an adhesive layer 70. The first substrate SUB1 comprises an insulating substrate 10, insulating films 11 to 13, a switching element SW, the heat dissipating plate HS, the reflective film M, the transparent conductive coating TE, a capacitive insulating film 14, and the pixel electrode PE.

The insulating substrate 10 is formed of insulating glass, resin or the like. Since the insulating substrate 10 is located on the side opposite to the observation position, the insulating substrate 10 may be untransparent. The switching element SW is located on the insulating substrate 10. The gate electrodes GE1 and GE2, which are integral with the gate line G1, are located on the insulating substrate 10 and are covered with the insulating film 11. The gate line G1, and the gate electrodes GE1 and GE2 are formed of a metal material such as aluminum (Al), titanium (Ti), silver (Ag), molybdenum (Mo), tungsten (W), copper (Cu), or chromium (Cr), or an alloy formed by combining these metal materials, and may have a single-layer structure or a multilayer structure.

The semiconductor layer SC is located on the insulating film 11 and is covered with the insulating film 12. The semiconductor layer SC is formed of, for example, polycrystalline silicon, but may be formed of amorphous silicon or an oxide semiconductor. The source electrode SE integral with the source line S1, and the drain electrode DE are located on the insulating film 12, and are covered with the organic film 13. That is, the switching element SW is covered with the organic film 13. The source line S1, the source electrode SE, and the drain electrode DE are formed of the same material and formed of, for example, the above-mentioned metal material. The source electrode SE is in contact with the semiconductor layer SC through the contact hole CH1 penetrating the insulating film 12. The drain electrode DE is in contact with the semiconductor layer SC through the contact hole CH2 penetrating the insulating film 12. The switching element SW shown in the figure has a bottom-gate structure in which the gate electrode GE is located under the semiconductor layer SC.

The heat dissipating plate HS is located on the insulating film 12 and is covered with the organic film 13. The heat dissipating plate HS is located in the same layer as the source electrode SE and the drain electrode DE. That is, the heat dissipating plate HS, the source electrode SE, and the drain electrode DE are located in the layer between the insulating film 12 and the organic film 13. The heat dissipating plate HS is formed of the same material as the source electrode SE and the drain electrode DE, and are formed of a metal material such as aluminum (Al), titanium (Ti), silver (Ag), molybdenum (Mo), tungsten (W), copper (Cu), or chromium (Cr) or an alloy formed by combining these metal materials, and may have a single-layer structure or a multilayer structure. The organic film 13 includes a removed portion RM at a position which overlaps the heat dissipating plate HS. The removed portion RM penetrates the organic film 13 toward the heat dissipating plate HS.

The reflective film M is located on the organic film 13. The reflective film M functions as, for example, a reflective film which reflects light incident from the second substrate SUB2 side, and also functions as a light-shielding film which blocks light traveling from the second substrate SUB2 side toward the switching element SW. The reflective film M is formed of, for example, a metal material such as aluminum. As a concrete example, the reflective film M is formed of a stacked layer body of aluminum and titanium or a stacked layer body of aluminum and molybdenum. The reflective film M is in contact with the transparent conductive coating TE and is thereby supplied with, for example, a common potential.

The transparent conductive coating TE covers the reflective film M. The transparent conductive coating TE functions as a capacitive electrode for securing the pixel capacitance. The transparent conductive coating TE is formed of, for example, a transparent conductive material such as indium tin oxide (ITO) or indium zinc oxide (IZO). The transparent conductive coating TE is covered with the capacitive insulating film 14. The capacitive insulating film 14 is in contact with the heat dissipating plate HS inside the removed portion RM. As shown in the figure, the transparent conductive coating TE and the reflective film M are electrically connected to each other since the transparent conductive coating TE is in contact with the reflective film M. In the example illustrated, the transparent conductive coating TE and the reflective film M are not formed at positions overlapping the removed portion RM. As described later, the transparent conductive coating TE and the reflective film M may be formed at positions overlapping the removed portion RM.

The pixel electrode PE is located on the capacitive insulating film 14. The pixel electrode PE is formed of, for example, a transparent conductive material such as ITO or IZO. The pixel electrode PE is opposed to the transparent conductive coating TE via the capacitive insulating film 14. The pixel electrode PE is electrically connected to the switching element SW through the contact hole CH3 which penetrates the organic film 13 and the capacitive insulating film 14 at a position overlapping the opening OP.

In the embodiment, the insulating films 11 and 12, and the capacitive insulating film 14 are formed of an inorganic insulating material such as silicon oxide (SiO), silicon nitride (SiN), or silicon oxynitride (SiON). The insulating films 11 and 12, and the capacitive insulating film 14 may have a single-layer structure or a multilayer structure. The capacitive insulating film 14 corresponds to a capacitive insulating film interposed between the transparent conductive coating TE and the pixel electrode PE. For example, the capacitive insulating film 14 is formed of a silicon nitride. The organic film 13 is formed of an organic insulating material.

The second substrate SUB2 comprises an insulating base 20 and a common electrode CE. An electrophoretic element 21 is located between the first substrate SUB1 and the second substrate SUB2. The insulating base 20 is formed of insulating glass, resin or the like. Since the insulating base 20 is located on the observation position side, the insulating base 20 is transparent. The common electrode CE is arranged on the electrophoretic element 21. The common electrode CE is a transparent electrode formed of a transparent conductive material such as ITO or IZO. The common electrode CE is formed over the substantially entire region of the display portion DA shown in FIG. 1. The common electrode CE is supplied with, for example, a common potential in the non-display portion NDA. The electrophoretic element 21 is arranged on the pixel electrode PE. The electrophoretic element 21 is formed of microcapsules 30 arranged with substantially no gaps formed therebetween. An adhesive layer 70 is located between the pixel electrode PE and the electrophoretic element 21.

The microcapsules 30 are, for example, spherical bodies having a particle diameter of approximately 5 to 100 µm. In the example illustrated, a number of microcapsules 30 are arranged between one pixel electrode PE and the common electrode CE, due to the constraints of a scale of the drawing, but approximately one to ten microcapsules 30 are arranged in a square pixel PX having each side being approximately several hundreds of micrometers long.

The microcapsule 30 comprises a dispersion medium 31, black particles 32, and white particles 33. The black particles 32 and the white particles 33 may be referred to as electrophoretic particles. An outer shell (wall film) 34 of the microcapsule 30 is formed by using, for example, a transparent resin such as acrylic resin. The dispersion medium 31 is a liquid for dispersing the black particles 32 and the white particles 33 in the microcapsule 30. The black particles 32 are, for example, particles (polymers or colloids) formed of black pigments such as aniline black and are, for example, positively charged. The white particles 33 are, for example, particles (polymers or colloids) formed of white pigments such as titanium dioxide and are, for example, negatively charged. Various additives can be added to these types of pigments as needed. In addition, for example, pigments whose colors are red, green, blue, yellow, cyan, magenta, and the like, may be used instead of the black particles 32 and the white particles 33.

In the electrophoretic element 21 having the above structure, when the pixel PX is urged to perform black display, the pixel electrode PE is held at a relatively higher potential than the common electrode CE. That is, when a potential of the common electrode CE is referred to as a reference potential, the pixel electrode PE is held in positive polarity. Thus, while the positively charged black particles 32 are attracted to the common electrode CE, the negatively charged white particles 33 are attracted to the pixel electrode PE. As a result, black color is visually recognized when the pixel PX is observed from the common electrode CE side. In contrast, when the pixel PX is urged to perform white display, the pixel electrode PE is held in negative polarity where a potential of the common electrode CE is referred to as the reference potential. Thus, while the negatively charged white particles 33 are attracted to the common electrode CE side, the positively charged black particles 32 are attracted to the pixel electrode PE. As a result, white color is visually recognized when the pixel PX is observed.

A high drive voltage is required for the display device DSP using the electrophoretic element 21. The display device DSP using the electrophoretic element 21 is not limited to the above-described example of monochromatic display but may execute full-color display. For example, Patent Literature 2 and Patent Literature 3 disclose that a high drive voltage of higher than or equal to 30V is required for an electrophoretic display capable of full-color display. In the embodiment, a display device driven at higher than or equal to 25V is assumed as a display device driven at a high voltage. For example, the driving voltage of the display device DSP is approximately 40V. When the drive voltage is made higher, the current flowing to the switching element SW becomes large, dissipation of the heat generated in the semiconductor layer SC becomes insufficient, and the semiconductor layer SC may be damaged. In addition, the semiconductor layer SC is covered with the organic film 13. As shown in FIG. 4, the thermal conductivity of acrylic resin used as the material of the organic film 13 is 0.25 W/m·K, which is smaller than that of the other glass, Al, ITO, Ti, Mo, SiN, SiO and the like. That is, the thermal conductivity of, particularly, acrylic resin, of the materials used for the layers of the first substrate SUB1, is low and, when the acrylic resin exists so as to cover the heat generation part, the heat generated in the semiconductor layer SC can hardly be discharged to the outside.

According to the embodiment, the display device DSP comprises a heat dissipating plate HS arranged at a position overlapping the semiconductor layer SC. The heat dissipating plate HS receives heat from the semiconductor layer SC via the insulating film 12 and cools the semiconductor layer SC by heat exchange with the outside. In addition, the organic film 13 includes the removed portion RM at a position which overlaps the semiconductor layer SC and the heat dissipating plate HS. Heat dissipation efficiency from the heat dissipating plate HS to the upper side can be improved by removing the organic film 13 having a low thermal conductivity. In addition, the removed portion RM is formed in a simultaneous process when the contact hole CH3 of the organic film 13 is formed. For this reason, the removed portion RM can be formed without increasing manufacturing processes.

In addition, in the structure where the heat dissipating plate HS or the removed portion RM is not formed, a thermal stress may be generated between the organic film 13 and the insulating film 12 at the heat generation part and film peeling may occur due to a difference in thermal expansion coefficient between the organic film 13 and the insulating film 12. In the embodiment, an interface area between the organic film 13 and the insulating film 12 is reduced at a heat generation part and film peeling can be thereby suppressed, by forming the removed portion RM.

Next, a modified example of the embodiment will be described.

Figure 5:
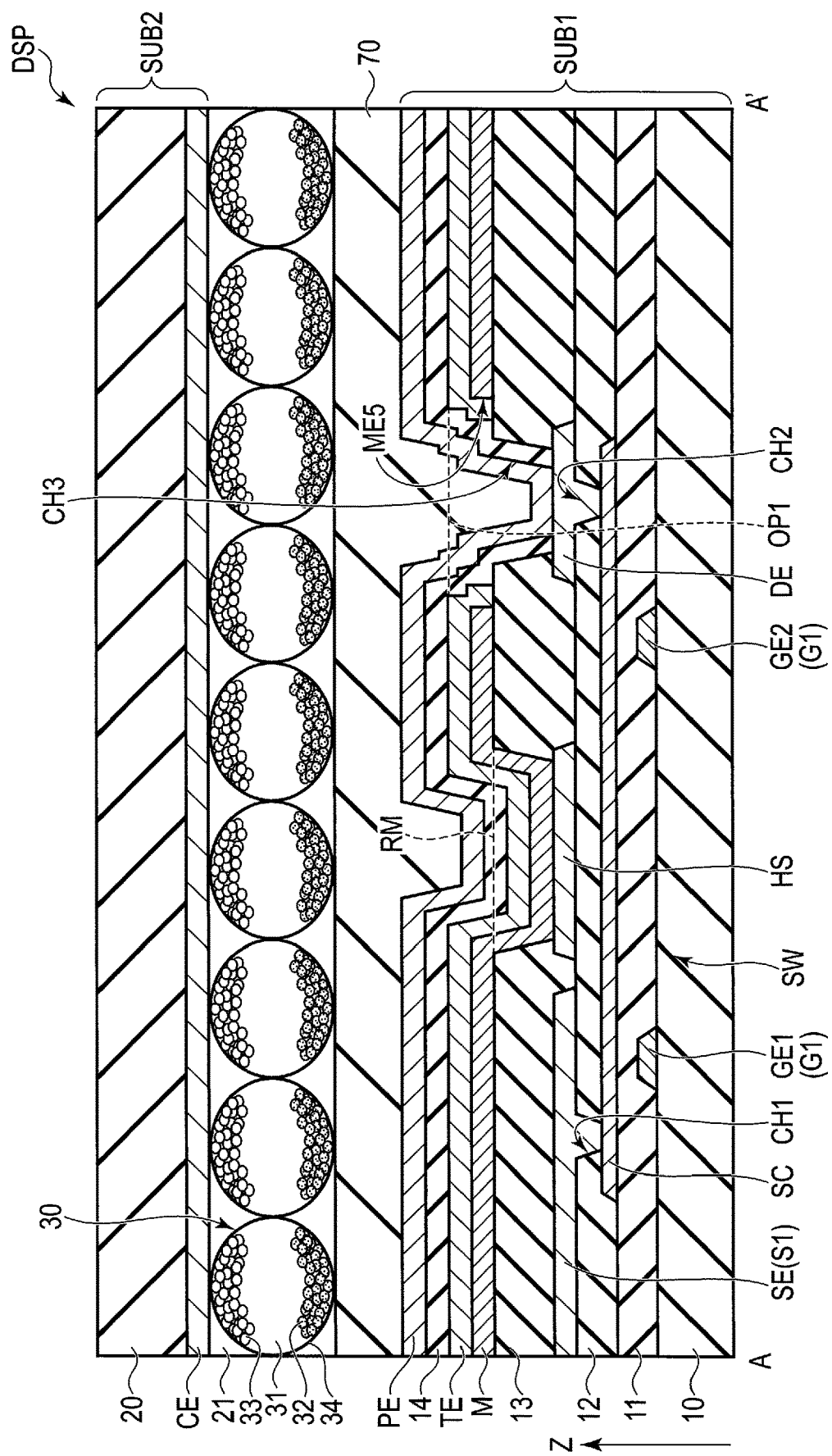
FIG. 5 is a cross-sectional view showing a first modified example of the embodiment.

FIG. 5 is a cross-sectional view showing a first modified example of the embodiment. The structure shown in FIG. 5 is different from the structure shown in FIG. 3 with respect to a feature that the reflective film M and the transparent conductive coating TE are also located inside the removed portion RM.

The reflective film M is in contact with the heat dissipating plate HS inside the removed portion RM. For this reason, the heat of the heat dissipating plate HS is transmitted to the reflective film M and then dissipated. The heat of the heat dissipating plate HS is directly transmitted to the reflective film M, which is a metal film, not via the capacitive insulating film 14. In addition, the heat of the heat dissipating plate HS is also transmitted to the transparent conductive coating TE via the reflective film M. The reflective film M and the transparent conductive coating TE dissipate the heat of the heat dissipating plate HS to the outside by exchanging heat with the outside. In addition, the storage capacitor can be increased by increasing the area of overlapping the transparent conductive coating TE and the pixel electrode PE at the position overlapping the removed portion RM.

Figure 6:
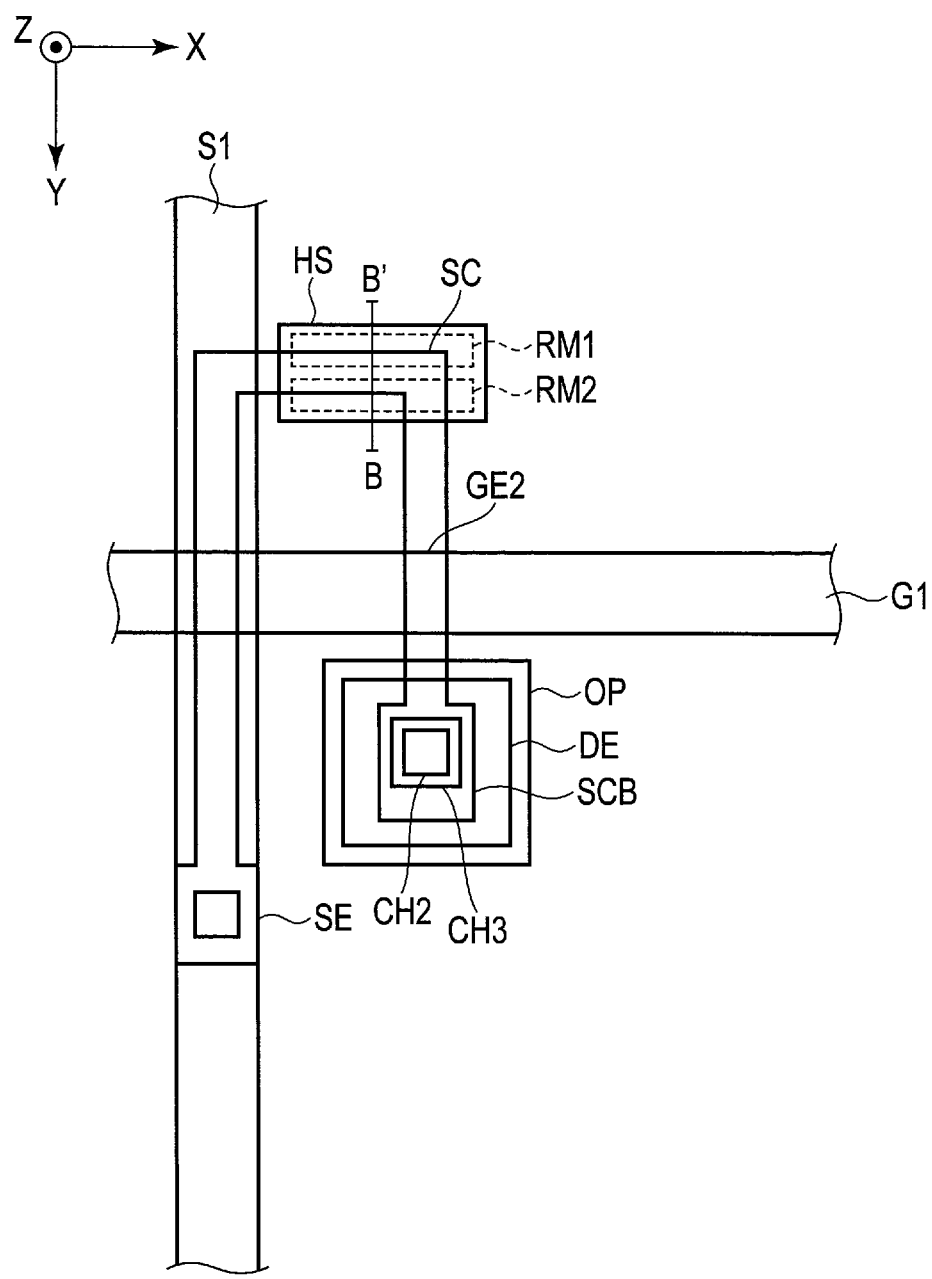
FIG. 6 is a plan view showing a second modified example of the embodiment.

FIG. 6 is a plan view showing a second modified example of the embodiment. The structure shown in FIG. 6 is different from the above-described embodiment with respect to a feature that removed portions RM1 and RM2 are formed at positions overlapping the heat dissipating plate HS.

Two removed portions RM1 and RM2 are formed at positions overlapping the heat dissipating plate HS. In addition, each of the removed portions RM1 and RM2 overlaps a part of the semiconductor layer SC. The removed portions RM1 and RM2 are formed in a rectangular shape in which the width in the first direction X is larger than the width in the second direction Y in planar view. The removed portions RM1 and RM2 are arranged in the second direction Y. Each of the width in the first direction X and the width in the second direction Y of the removed portion RM1 is in a range from 1 to 10 μm. Similarly, each of the width in the first direction X and the width in the second direction Y of the removed portion RM2 is in a range from 1 to 10 μm.

FIG. 7 is a cross-sectional view showing the switching element SW shown in FIG. 6 seen along line B-B'.

The organic film 13 includes the removed portions RM1 and RM2 which penetrate to the heat dissipating plate HS. The reflective film M is in contact with the heat dissipating plate HS inside the removed portions RM1 and RM2. The surface area of the reflective film M at the positions overlapping the heat dissipating plate HS can be increased and the dissipation efficiency can be improved by forming the removed portions RM1 and RM2.

In the second modified example, too, the same advantages as the above-described embodiments can be obtained.

Figure 8:
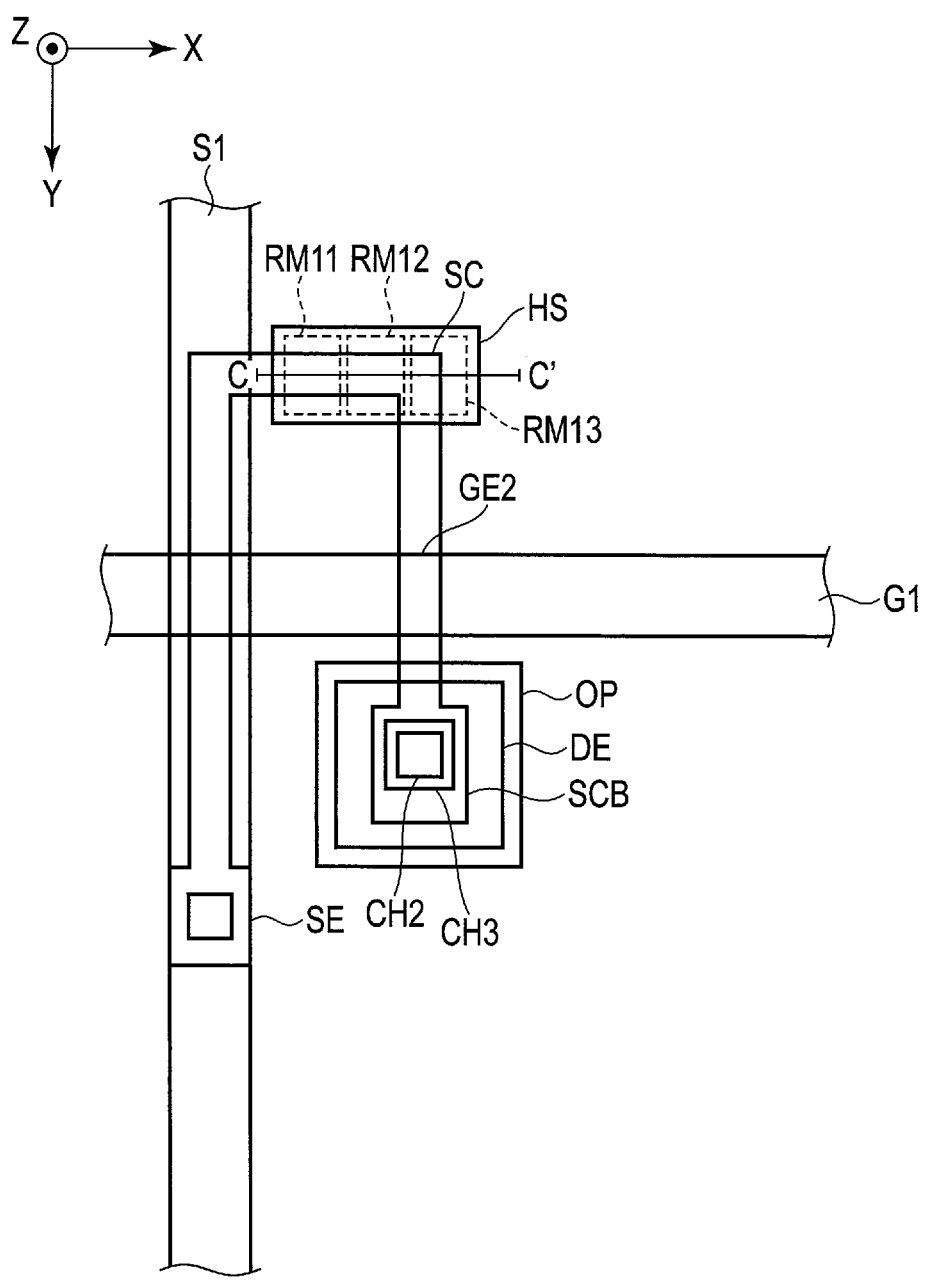
FIG. 8 is a plan view showing a third modified example of the embodiment.

FIG. 8 is a plan view showing a third modified example of the embodiment. The structure shown in FIG. 8 is different from the structure shown in FIG. 6 with respect to a feature that three removed portions RM11, RM12, and RM13 are formed at positions overlapping one heat dissipating plate HS.

Three removed portions RM11, RM12, and RM13 are formed at positions overlapping the heat dissipating plate HS. In addition, each of the removed portions RM11, RM12, and RM13 overlaps a part of the semiconductor layer SC. The removed portions RM11, RM12, and RM13 are arranged in the first direction X. Each of the width in the first direction X and the width in the second direction Y of the removed portion RM1 is in a range from 1 to 10 μm. Similarly, each of the width in the first direction X and the width in the second direction Y of the removed portion RM2 is in a range from 1 to 10 μm. Similarly, each of the width in the first direction X and the width in the second direction Y of the removed portion RM2 is in a range from 1 to 10 μm.

FIG. 9 is a cross-sectional view showing the switching element SW shown in FIG. 8 seen along line C-C'.

The organic film 13 includes the removed portions RM11, RM12, and RM13 which penetrate to the heat dissipating plate HS. The reflective film M is in contact with the heat dissipating plate HS inside the removed portions RM11, RM12, and RM13. The surface area of the reflective film M at the positions overlapping the heat dissipating plate HS can be increased and the dissipation efficiency can be improved by forming the removed portions RM11, RM12, and RM13. The shape and the arrangement of a plurality of removed portions are not limited to the structures described in the second and third modified examples.

In the third modified example, too, the same advantages as the above-described embodiments can be obtained.

Figure 10:
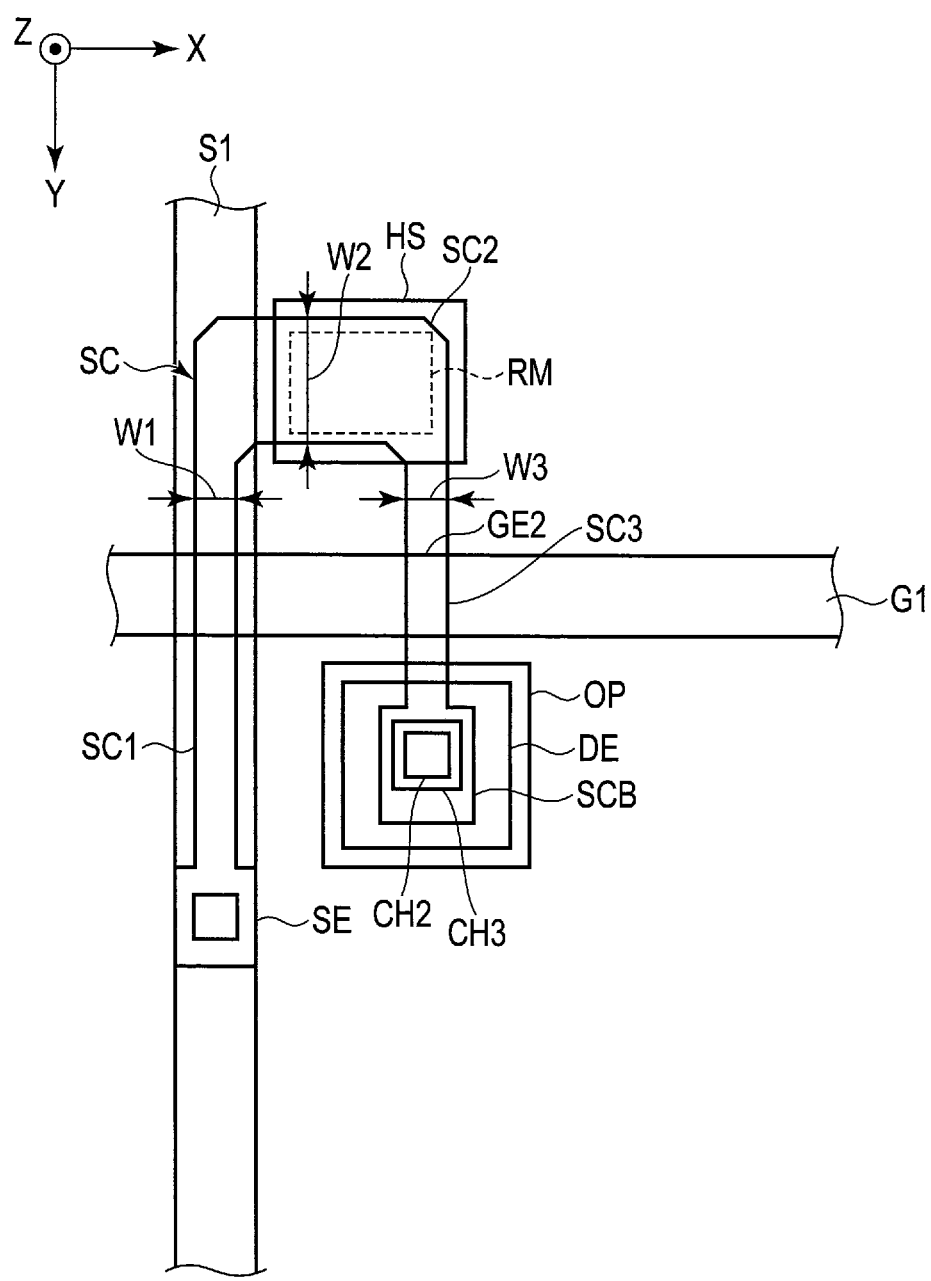
FIG. 10 is a plan view showing a fourth modified example of the embodiment.

FIG. 10 is a plan view showing a fourth modified example of the embodiment. The structure shown in FIG. 10 is different from the above-described embodiment with respect to the width of the semiconductor layer SC.

The semiconductor layer SC includes a first part SC1 extending in the second direction Y and overlapping the source line S1, a second part SC2 extending in the first direction X and overlapping the heat dissipating plate HS, and a third part SC3 extending in the second direction Y. Each of the first part SC1 and the third part SC3 intersects the gate line G1. The first part SC1 has a width W1 in the first direction X. The second part SC2 has a width W2 in the second direction Y. The third part SC3 has a width W3 in the first direction X. The width W2 is larger than the width W1 and is, for example, two or more times as large as the width W1. In addition, the width W2 is larger than the width W3 and is, for example, two or more times as large as the width W3. The widths W1 and W3 are substantially equal to each other.

The current density can be lowered and the heat generation of the semiconductor layer SC can be reduced by increasing the width W2 of the second part SC2. In addition, the size of the heat dissipating plate HS and the removed portion RM can be enlarged in accordance with the semiconductor layer SC. The heat dissipation property of the semiconductor layer SC can be thereby further improved.

In the fourth modified example, too, the same advantages as the above-described embodiments can be obtained.

FIG. 11 is a cross-sectional view showing a fifth modified example of the embodiment. The structure shown in FIG. 11 is different from the above-described embodiment with respect to a feature that removed portion RM does not penetrate to the heat dissipating plate HS.

The organic film 13 includes a thin film part 13a at the position overlapping the removed portion RM. The thin film part 13a of the organic film 13 is interposed between the removed portion RM and the heat dissipating plate HS. The organic film 13 has a thickness T1 at the position which does not overlap the removed portion RM and a thickness T2 at the thin film part 13a which overlaps the removed portion RM. The thickness T2 is smaller than the thickness T1. Resistance to static electricity can be improved by thus forming the thin film part 13a. The thickness T2 of the thin film part 13a should desirably be smaller from the viewpoint of heat dissipation of the heat dissipating plate HS.

In the fifth modified example, too, the same advantages as the above-described embodiments can be obtained.

Figure 12:
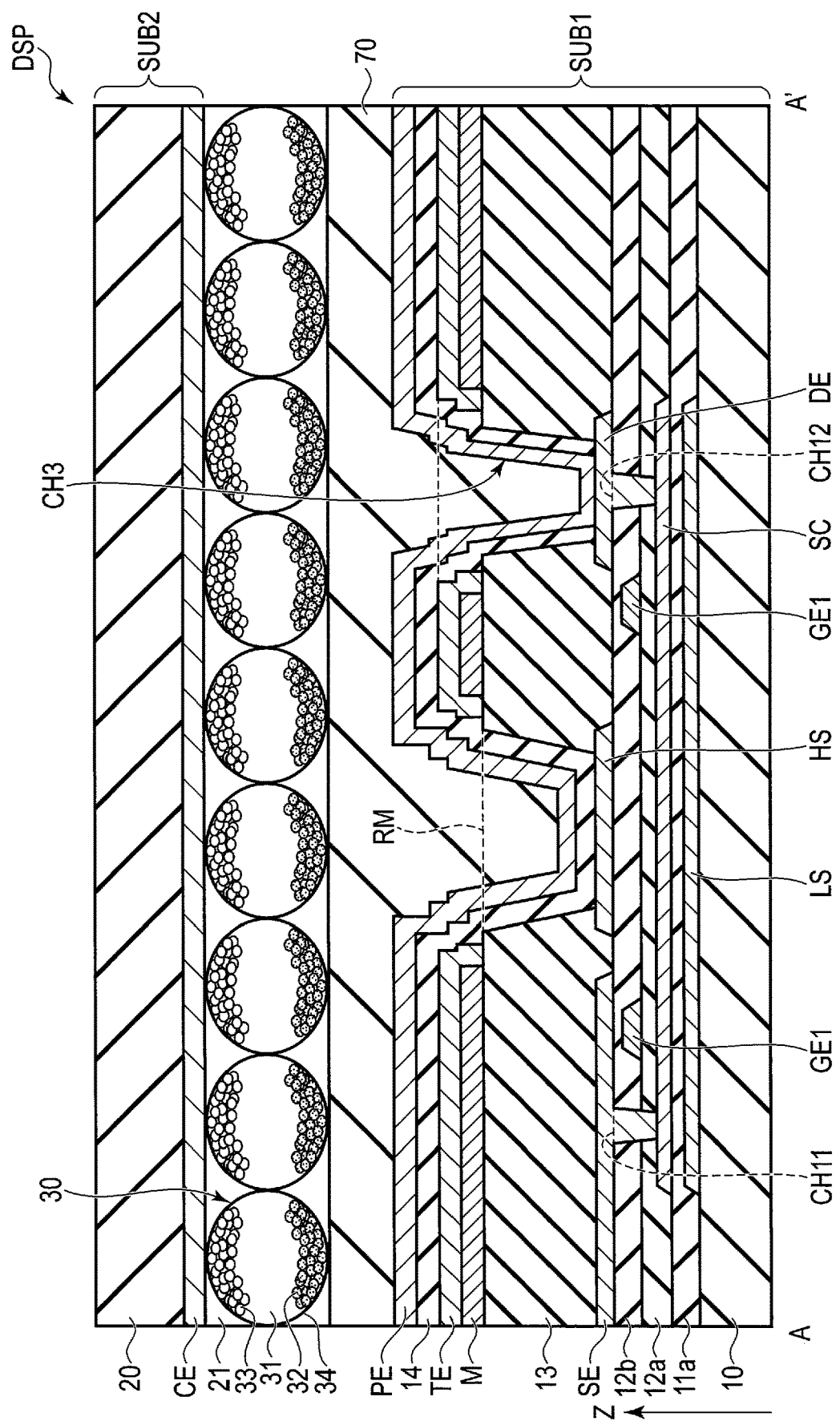
FIG. 12 is a cross-sectional view showing a sixth modified example of the embodiment.

FIG. 12 is a cross-sectional view showing a sixth modified example of the embodiment. The structure shown in FIG. 12 is different from the structure shown in FIG. 3 with respect to a feature that the switching element SW has a top-gate structure.

A light-shielding layer LS is located on the insulating substrate 10. An insulating film 11a covers the light-shielding layer LS. The semiconductor layer SC is located on the insulating film 11a. An insulating film 12a covers the semiconductor layer SC. The gate electrodes GE1 and GE2 are located on the insulating film 12a. An insulating film 12b covers the gate electrodes GE1 and GE2. The source electrode SE, the drain electrode DE, and the heat dissipating plate HS are located on the insulating film 12b. The source electrode SE is in contact with the semiconductor layer SC through a contact hole CH11 which penetrates the insulating films 12a and 12b. The drain electrode DE is in contact with the semiconductor layer SC through a contact hole CH12 which penetrates the insulating films 12a and 12b. The switching element SW shown in the figure has a top-gate structure in which the gate electrodes GE1 and GE2 are located above the semiconductor layer SC.

In the sixth modified example, too, the same advantages as the above-described embodiments can be obtained.

Figure 13:
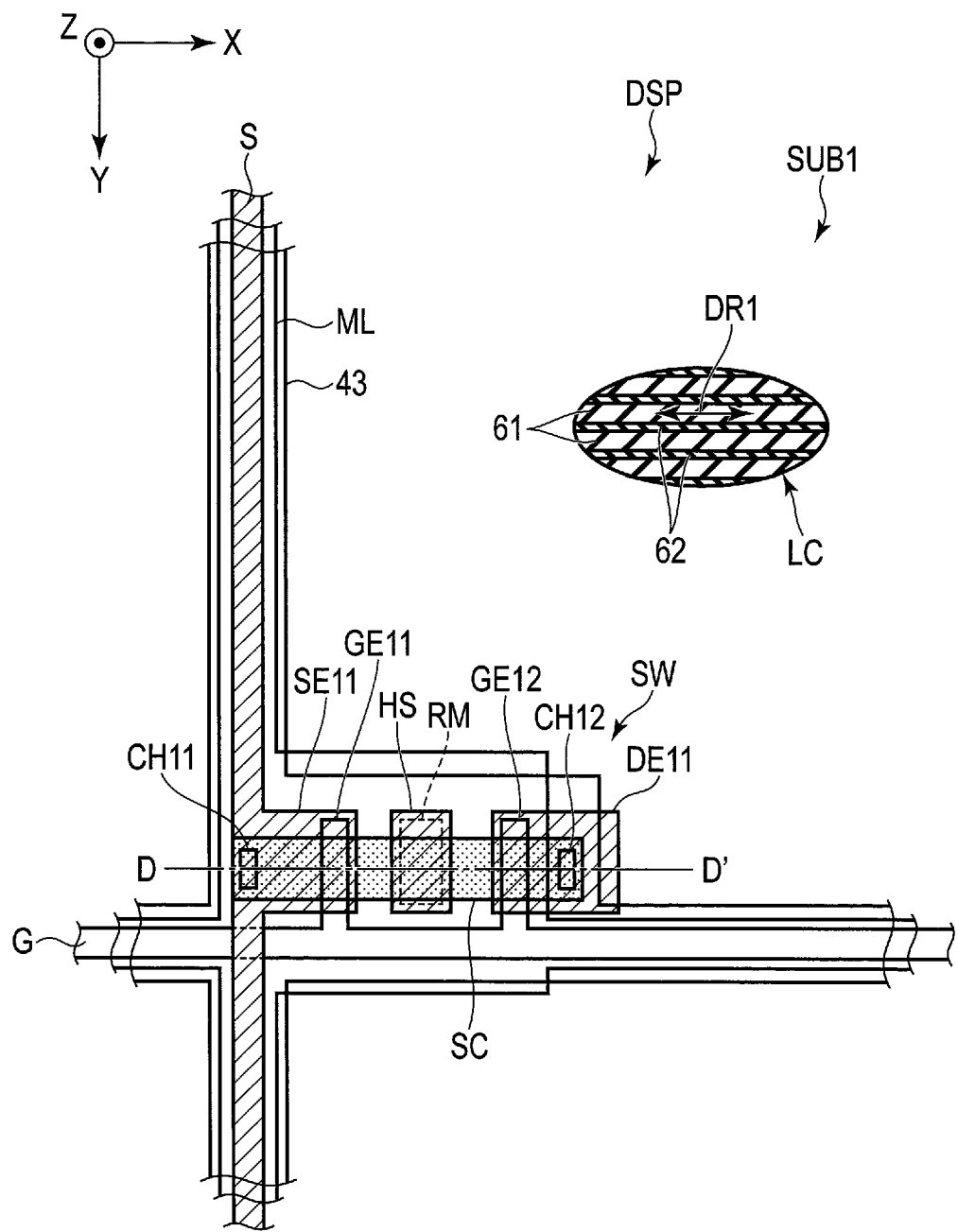
FIG. 13 is a plan view showing a seventh modified example of the embodiment.

FIG. 13 is a plan view showing a seventh modified example of the embodiment. A display device DSP of FIG. 13 is a display device which switches transparency and scattering with polymer dispersed liquid crystal (PDLC). The polymer dispersed liquid crystal is provided between the first substrate SUB1 and the second substrate SUB2. FIG. 13 shows the structure of the first substrate SUB1. In FIG. 13, illustration of the transparent conductive coating TE and the pixel electrode PE is omitted.

The first substrate SUB1 comprises the gate line G, the source line S intersecting the gate line G, the switching element SW electrically connected to the gate line G and the source line S, the metal line ML, an organic film 43, the heat dissipating plate HS, and the like.

The gate line G extends in the first direction X. The source line S extends in the second direction Y. The switching element SW is arranged at an intersection of the gate line G and the source line S. The semiconductor layer SC is formed in a rectangular shape in planar view and extends in the first direction X. Gate electrodes GE11 and GE12 protrude from the gate line G in the second direction Y. A source electrode SE11 protrudes from the source line S in the first direction X and overlaps the semiconductor layer SC and the gate electrode GE11. The drain electrode DE11 is formed in an insular shape and overlaps the gate electrode GE12. The source electrode SE11 is in contact with the semiconductor layer SC through the contact hole CH11. The drain electrode DE11 is in contact with the semiconductor layer SC through the contact hole CH12.

The heat dissipating plate HS and the removed portion RM are located between the gate electrodes GE11 and GE12 in planar view. The heat dissipating plate HS and the removed portion RM overlap the semiconductor layer SC.

The organic film 43 is patterned and formed in a grating shape in planar view. That is, the organic film 43 overlaps each of the gate line G, the source line S, and the switching element SW. The metal line ML is formed in a grating in a planar view. That is, the metal line ML overlaps each of the gate line G, the source line S, and the switching element SW.

As enlarged in FIG. 13, the liquid crystal layer LC comprises polymer dispersed liquid crystal containing polymer 61 and liquid crystal molecules 62.

For example, the polymer 61 is a liquid crystal polymer. The polymer 61 is formed in a stripe shape extending in one direction. For example, an extending direction DR1 of the polymer 61 is a direction parallel to the first direction X. The liquid crystal molecules 32 are dispersed in gaps of the polymer 61 and aligned such that their longer axis extends in the first direction X. Each of the polymer 61 and the liquid crystal molecules 62 has the optical anisotropy or refractive anisotropy. The responsive property of the polymer 61 to the electric field is lower than that of the liquid crystal molecules 62 to the electric field.

For example, the orientation of alignment of the polymer 61 is hardly varied irrespective of the presence or absence of the electric field. In contrast, the orientation of alignment of the liquid crystal molecules 62 is varied in accordance with the electric field in a state in which a voltage higher than or equal to the threshold value is applied to the liquid crystal layer LC. In a state in which the voltage is not applied to the liquid crystal layer LC, optical axes of the polymer 61 and the liquid crystal molecules 62 are parallel to one another and the light made incident on the liquid crystal layer LC is transmitted without being substantially scattered in the liquid crystal layer LC (transparent state). In a state in which the voltage is applied to the liquid crystal layer LC, optical axes of the polymer 61 and the liquid crystal molecules 62 intersect one another and the light made incident on the liquid crystal layer LC is scattered in the liquid crystal layer LC (scattered state).

In the display device using the polymer dispersed liquid crystal, too, driving a high voltage is required similarly to the electrophoretic display.

Figure 14:
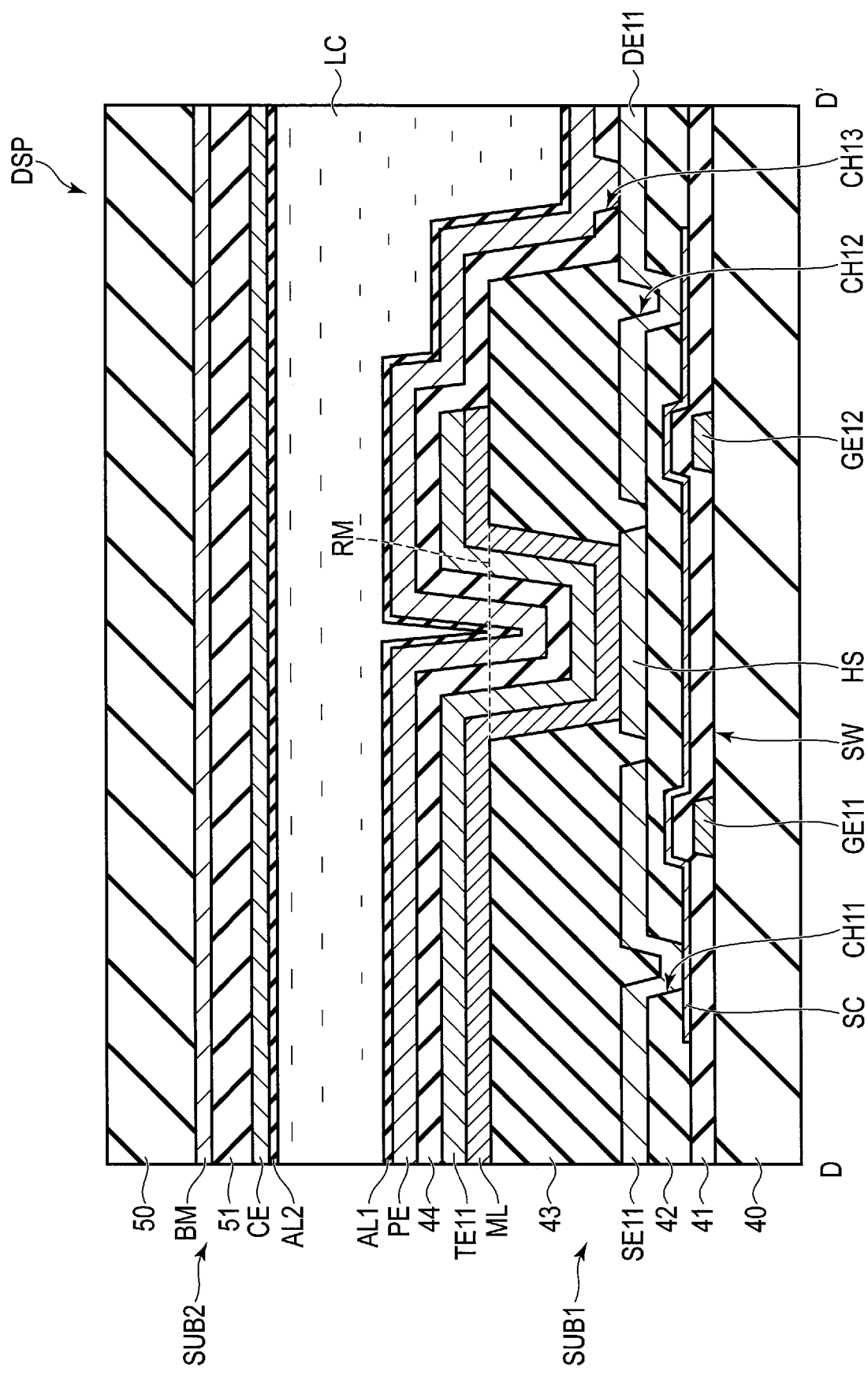
FIG. 14 is a cross-sectional view showing the display device shown in FIG. 13 seen along line D-D'.

FIG. 14 is a cross-sectional view showing the display device DSP shown in FIG. 13 seen along line D-D'.

The display device DSP comprises the first substrate SUB1, the second substrate SUB2 opposed to the first substrate SUB1, and the liquid crystal layer LC located between the first substrate SUB1 and the second substrate SUB2.

The first substrate SUB1 comprises an insulating substrate 40, the switching element SW, an insulating film 41, an insulating film 42, the heat dissipating plate HS, an organic film 43, the metal line ML, a transparent conductive coating TE11, an insulating film 44, the pixel electrode PE, and an alignment film AL1.

The gate electrodes GE11 and GE12 are located on the insulating substrate 40. The insulating film 41 covers the gate electrodes GE1 and GE2. The semiconductor layer SC is located on the insulating film 41. The insulating film 42 covers the semiconductor layer SC. The source electrode SE11 and the drain electrode DE11 are located on the insulating film 42. The source electrode SE11 is in contact with the semiconductor layer SC through the contact hole CH11 formed in the insulating film 42. The drain electrode DE11 is in contact with the semiconductor layer SC through the contact hole CH12 formed in the insulating film 42.

The heat dissipating plate HS is located on the insulating film 42. The heat dissipating plate HS overlaps the semiconductor layer SC. The organic film 43 covers the source electrode SE11, the drain electrode DE11, and the heat dissipating plate HS. The heat dissipating plate HS is located in the same layer as the source electrode SE11 and the drain electrode DE11. That is, the heat dissipating plate HS, the source electrode SE11, and the drain electrode DE11 are located in the layer between the insulating film 42 and the organic film 43. The heat dissipating plate HS is formed of the same material as the source electrode SE11 and the drain electrode DE11. The organic film 43 includes the removed portion RM at a position which overlaps the heat dissipating plate HS. The removed portion RM penetrates the organic film 43 toward the heat dissipating plate HS. The removed portion RM is formed in a simultaneous process when the opening of the organic film 43 is formed.

The metal layer ML is located on the organic film 43. The metal line ML is in contact with the heat dissipating plate HS inside the removed portion RM. The same advantages as those of the second modified example shown in FIG. 5 can be thereby obtained. The transparent conductive coating TE11 covers the metal line ML. As shown in the figure, the transparent conductive coating TE11 and the metal line ML are electrically connected to each other since the transparent conductive coating TE11 is in contact with the metal line ML.

The insulating film 44 covers the transparent conductive coating TE11. In addition, the insulating film 44 also covers the organic film 43. The pixel electrode PE is located on the insulating film 44. The pixel electrode PE is electrically connected to the switching element SW through a contact hole CH13 which penetrates the insulating film 44. The contact hole CH13 is formed at a position which does not overlap the organic film 43. The alignment film AL1 covers the pixel electrode PE.

The second substrate SUB2 includes an insulating substrate 50, a light-shielding layer BM, an organic film 51, the common electrode CE, and an alignment film AL2. The light-shielding layer BM is located on the surface of the insulating substrate 50 on the first substrate SUB1 side. The organic film 51 covers the light-shielding layer BM. The common electrode CE is located on the surface of the organic film 51 on the first substrate SUB1 side. The alignment film AL2 covers the common electrode CE.

In the seventh modified example, too, the same advantages as the above-described advantages can be obtained.

The embodiment can be applied to a display device employing electrophoresis or a display device employing PDLC. In addition, the embodiment can be applied not only to this example but to, for example, a display device driven with a high voltage of higher than or equal to 25V.

As described above, according to the embodiment, a display device capable of suppressing the damage resulting from heat generation of the thin-film transistor can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    an insulating substrate;
    an organic film disposed on the insulating substrate and including a first removed portion;
    a switching element located between the insulating substrate and the organic film and comprising a semiconductor layer, a gate electrode, a source electrode, and a drain electrode; and
    a metal layer located in a same layer as the source electrode and the drain electrode and overlapping the first removed portion, wherein
    the first removed portion overlaps the semiconductor layer between the source electrode and the drain electrode of the switching element, and
    the metal layer does not overlap the gate electrode.

2. The display device of claim 1, wherein
    the metal layer is a heat dissipating plate, and
    the first removed portion penetrates the organic film toward the heat dissipating plate.

3. The display device of claim 1, wherein
the metal layer is a heat dissipating plate, and
the organic film is interposed between the first removed portion and the heat dissipating plate.

4. The display device of claim 2, further comprising:
a reflective film located on the organic film,
wherein
the reflective film is in contact with the heat dissipating plate inside the first removed portion.

5. The display device of claim 2, wherein
the organic film includes a second removed portion at a position overlapping the heat dissipating plate.

6. The display device of claim 1, further comprising:
a source line connected to the source electrode,
wherein
the semiconductor layer includes a first part overlapping the source line and a second part overlapping the metal layer, and
a width of the second part is larger than a width of the first part.

7. The display device of claim 6, wherein
the width of the second part is two or more times as large as the width of the first part.

8. The display device of claim 1, wherein
the switching element comprises the gate electrode located at an upper position than the semiconductor layer.

9. The display device of claim 1, wherein
the switching element comprises the gate electrode located at a lower position than the semiconductor layer.

10. The display device of claim 1, further comprising:
a liquid crystal layer including a polymer and liquid crystal molecules,
wherein
the gate electrode comprises a first gate electrode and a second gate electrode, and
the metal layer and the first removed portion are located between the first gate electrode and the second gate electrode in planar view.

* * * * *